(No Model.)
A. TWYMAN.
CAR TRUCK.
No. 510,370.  Patented Dec. 5, 1893.
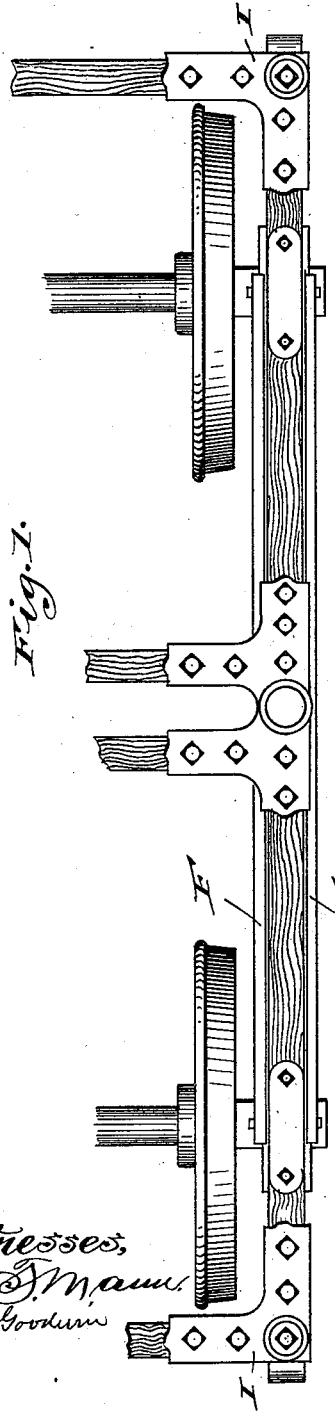
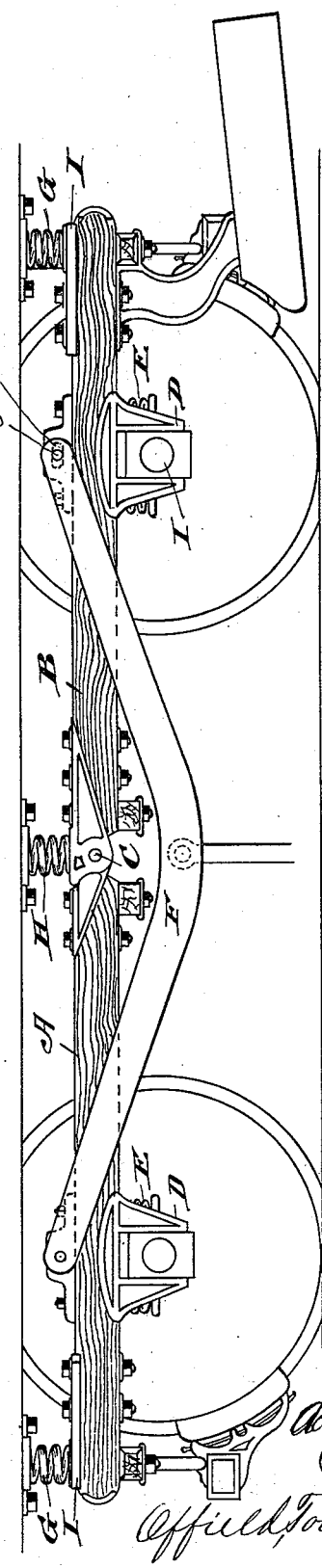

UNITED STATES PATENT OFFICE.

AARON TWYMAN, OF PULLMAN, ILLINOIS.

CAR-TRUCK.

SPECIFICATION forming part of Letters Patent No. 510,370, dated December 5, 1893.

Application filed April 3, 1893. Serial No. 468,904. (No model.)

*To all whom it may concern:*

Be it known that I, AARON TWYMAN, a citizen of the United States, residing at Pullman, in the county of Cook and State of Illinois, have invented certain new and useful Improvements in Car-Trucks, of which the following is a specification.

My invention relates to a non-oscillating truck, particularly intended for use on street cars.

The object of my invention is the construction of a car truck in such manner that oscillation of the car body in the direction of its length will be prevented or reduced to a minimum. The tendency of car bodies to rock or oscillate upon their trucks when the latter are short has led to the adoption within recent years of a long truck frame, that is one extending at each end beyond the wheels and the carrying springs for the car body being arranged at the ends of this frame. This construction while accomplishing partly the object sought leaves much to be desired in this direction and introduces objectionable features of construction which are too well known to require enumeration. The desire has always been to get a long spring base with a limited wheel base. I have accomplished all of the useful objects attained by such construction without making the spring base unduly long while retaining such a limited wheel base as to permit proper movement of the truck in rounding curves without riding of the wheels upon the rails. The leading feature of my construction consists in the employment of a truck frame which is transversely divided between the wheels and the inner or adjacent ends being hinged together and having carrying springs mounted at the outer ends of the truck sections and intermediate carrying springs mounted upon the inner ends above the hinge. In this construction therefore each section of the truck is free to oscillate around the axle of the pair of truck wheels upon which it is mounted, and being hinged the rocking of one section will effect the rocking of the other but always in the contrary direction.

The particular construction will be best understood from the accompanying drawings, in which—

Figure 1 is a plan view, partly broken away; and Fig. 2 is a side elevation.

In the drawings, A, B represent, respectively, the two sections of a truck frame which are pivotally connected together by transverse horizontal pivots,—as, for example, the pin or bolt C. These sections are mounted upon the journal boxes D, and are preferably cushioned by the springs E. The curved bar F has its ends pivotally connected to the trucks above their pivotal axes and preferably by a slot and pin connection at one end, as shown at *f*, the purpose of the slot and pin connection being to permit the rocking of the trucks around the axles. This bar affords a convenient means for suspending a motor without communicating thereto any of the oscillatory movement.

Mounted upon each of the outer corners of the trucks are the body carrying springs G and H, the latter being seated directly over the joint or hinge between the truck sections. The springs G and H support and carry the car body yieldingly upon the trucks. I find it expedient to arrange the body carrying springs at the outer corner of the truck frames and at points directly above the point of their pivotal connection to each other. By this arrangement I secure all the desirable results accomplished by the extended spring base while the construction is simplified and the cost reduced. The largest cars may be carried upon trucks having a comparatively short spring base with a minimum amount of oscillation. Now the effect of this arrangement being considered, it will readily be seen that if one end of the car body should move down, the truck section toward that end would rock around its axle, the outer end of the truck section moving down with the car and the inner end up, thus compressing the outer carrying spring of that section. By this action the inner end of the other truck section would be elevated and its outer end depressed. Such depression would permit the opposite end of the car to descend and thus the depression of one end of the car would result in the equal depression of its opposite end. The arrangement of springs and the hinging of the truck sections together are therefore such as to exactly compensate and balance the movements. Of course these movements will be but slight with the described arrangement which is calculated to reduce oscillation or lengthwise tipping of the car to the minimum.

The details of the construction may be considerably varied. I have shown the timbers of the truck sections connected together at their corners by angle castings I, the inner ones having ear pieces transversely perforated for the passage of the pivot pins or bolts. The hinge members may be arranged so that the pivotal point of the hinge shall be in line with the axle centers, and a single hinge pin may be used and extend transversely across the truck and utilized as a brake rocker shaft. The form of bar F may be modified or entirely omitted.

I claim—

1. A car truck comprising in combination two truck sections pivotally connected together by horizontal pivots, each of said sections adapted to be mounted upon the journal box of a pair of truck wheels, and body supporting springs seated upon said truck sections, substantially as described.

2. A car truck comprising in combination two truck sections pivotally connected together, car body supporting springs mounted toward the outer corners of said truck sections and intermediate springs arranged above the pivotal connection between the truck sections, substantially as described.

3. A car truck comprising in combination two rectangular frame sections pivotally connected together at their adjacent inner corners, body supporting springs seated upon the outer corners of said truck sections and intermediate springs arranged above the pivotal connection of the truck sections, substantially as described.

4. A car truck comprising in combination two frame sections pivotally connected together, bars having a sliding connection at one end with the truck sections respectively, and carrying springs seated upon such truck sections and adapted to support the car body, substantially as described.

5. A car truck comprising in combination two frame sections arranged adjacent to each other, mounted upon independent wheel supports and having their adjacent ends pivotally connected together, carrying springs arranged at the outer ends of the truck sections, intermediate carrying springs arranged above the pivots, and downwardly curved connecting bars having slot and pin connections with the respective truck sections, substantially as described.

AARON TWYMAN.

Witnesses:
C. C. LINTHICUM,
N. M. BOND.